(12) United States Patent
Tan et al.

(10) Patent No.: US 12,613,546 B2
(45) Date of Patent: Apr. 28, 2026

(54) MOBILE PASSIVE JOYSTICK WITH MAGNET SENSING

(71) Applicant: Dell Products L.P., Round Rock, TX (US)

(72) Inventors: Loo Shing Tan, Singapore (SG); Michiel Sebastiaan Emanuel Petrus Knoppert, Amsterdam (NL); Gerald Rene Pelissier, Mendham, NJ (US); Chiu-Jung Tsen, Zhubei City (TW); Brandon Joel Brocklesby, Pflugerville, TX (US); Hsu-Feng Lee, Taipei (TW); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 18/788,440

(22) Filed: Jul. 30, 2024

(65) Prior Publication Data

US 2026/0037017 A1 Feb. 5, 2026

(51) Int. Cl.
*G05G 9/047* (2006.01)
*G06F 3/01* (2006.01)

(52) U.S. Cl.
CPC ............. *G05G 9/047* (2013.01); *G06F 3/016* (2013.01); *G05G 2009/04755* (2013.01)

(58) Field of Classification Search
CPC .......... G05G 9/047; G05G 2009/04755; G06F 3/016
See application file for complete search history.

(56) References Cited

U.S. PATENT DOCUMENTS

| | | | | |
|---|---|---|---|---|
| 4,748,323 A | * | 5/1988 | Holiday | G01V 8/20 |
| | | | | 250/221 |
| 6,222,525 B1 | | 4/2001 | Armstrong | |
| 6,563,533 B1 | | 5/2003 | Colby | |
| 6,636,197 B1 | | 10/2003 | Goldenberg | |
| 6,902,332 B2 | | 6/2005 | McLoone | |
| 7,248,252 B2 | | 7/2007 | Amari | |
| 7,368,673 B2 | | 5/2008 | Sato | |
| 7,390,985 B2 | | 6/2008 | Onodera | |
| 7,518,745 B2 | | 4/2009 | Guerraz | |
| 7,570,254 B2 | | 8/2009 | Suzuki | |
| 7,643,017 B2 | | 1/2010 | Lai | |

(Continued)

FOREIGN PATENT DOCUMENTS

| | | | | |
|---|---|---|---|---|
| WO | 2007114631 A2 | 10/2007 | | |
| WO | WO-2021155941 A1 | * | 8/2021 | ............. G06F 3/012 |

*Primary Examiner* — William Lu
(74) *Attorney, Agent, or Firm* — WOMBLE BOND DICKINSON (US) LLP

(57) ABSTRACT

Methods and systems for providing computer implemented services using user input are disclosed. To obtain the user input, a passive human interface device may be used. The human interface device may encode information regarding actuations of the human interface device in magnetic field distributions emanating from the human interface device. The magnetic field distribution may be sensed to identify user input provided by a user of the human interface device. The user input may be interpreted in the context of different modes of operation of the human interface device. The user input may be used to provide the computer implemented services.

20 Claims, 13 Drawing Sheets

(56)                References Cited

U.S. PATENT DOCUMENTS

|  |  |  |  |  |
|---|---|---|---|---|
| 8,190,993 | B2 | 5/2012 | Kondo | |
| 8,217,742 | B2 | 7/2012 | Trudeau | |
| 8,368,649 | B2 | 2/2013 | Hall | |
| 8,581,718 | B2 | 11/2013 | Muller | |
| 8,654,095 | B1 | 2/2014 | Cho et al. | |
| 8,796,566 | B2 | 8/2014 | Kerner | |
| 8,918,219 | B2 | 12/2014 | Sloo | |
| 9,195,351 | B1 | 11/2015 | Rosenberg | |
| 9,285,903 | B1 | 3/2016 | Yun | |
| 9,323,356 | B2 | 4/2016 | Kuo | |
| 9,459,794 | B1 | 10/2016 | Soegiono | |
| 9,785,272 | B1 | 10/2017 | Rosenberg | |
| 10,139,930 | B2 * | 11/2018 | Files | G06F 3/0488 |
| 10,198,172 | B2 * | 2/2019 | Choi | G06F 3/0488 |
| 10,331,220 | B2 * | 6/2019 | Hautson | G06F 3/046 |
| 10,423,245 | B2 | 9/2019 | Keating | |
| 10,436,567 | B2 | 10/2019 | Hautson | |
| 10,502,271 | B2 * | 12/2019 | Battlogg | F16D 57/002 |
| 10,504,672 | B2 | 12/2019 | Hu | |
| 10,606,378 | B2 * | 3/2020 | Rao | G06F 9/451 |
| 10,613,692 | B2 * | 4/2020 | Ballan | G06F 3/0442 |
| 10,649,556 | B2 | 5/2020 | Chu | |
| 10,664,110 | B2 * | 5/2020 | Yin | G06F 3/0393 |
| 10,719,145 | B1 | 7/2020 | Files et al. | |
| 10,838,525 | B2 | 11/2020 | Chu | |
| 10,845,764 | B2 | 11/2020 | Ely | |
| 10,921,914 | B2 | 2/2021 | Hu | |
| 10,962,935 | B1 | 3/2021 | Ely | |
| 11,036,318 | B2 | 6/2021 | Bokma | |
| 11,048,344 | B1 | 6/2021 | Drezet | |
| 11,106,291 | B2 * | 8/2021 | Takaoka | G06F 3/044 |
| 11,360,440 | B2 | 6/2022 | Perkins | |
| 11,387,058 | B2 | 7/2022 | Hwang | |
| 11,531,306 | B2 | 12/2022 | Ely | |
| 11,567,524 | B2 * | 1/2023 | Mano | G05G 5/05 |
| 11,762,488 | B1 * | 9/2023 | Korol | G06F 3/0393 345/157 |
| 11,809,646 | B1 | 11/2023 | Knoppert et al. | |
| 11,861,076 | B1 * | 1/2024 | Tan | G06F 3/02 |
| 11,874,687 | B1 | 1/2024 | Tan | |
| 11,886,700 | B1 | 1/2024 | Lee | |
| 11,907,449 | B2 | 2/2024 | Nieh | |
| 11,923,842 | B1 | 3/2024 | Tan | |
| 2005/0083316 | A1 | 4/2005 | Brian et al. | |
| 2006/0012584 | A1 * | 1/2006 | Vassallo | G06F 3/016 345/184 |

| 2006/0082545 | A1 | 4/2006 | Choquet | |
|---|---|---|---|---|
| 2006/0092136 | A1 | 5/2006 | Nishimura | |
| 2006/0205368 | A1 | 9/2006 | Bustamante et al. | |
| 2007/0152988 | A1 | 7/2007 | Levin | |
| 2007/0171205 | A1 | 7/2007 | Steinberg | |
| 2008/0084387 | A1 * | 4/2008 | Mcardle | G06F 3/0213 345/158 |
| 2008/0231595 | A1 | 9/2008 | Krantz | |
| 2008/0238879 | A1 * | 10/2008 | Jaeger | G06F 3/0338 345/173 |
| 2009/0033632 | A1 | 2/2009 | Szolyga et al. | |
| 2010/0053085 | A1 * | 3/2010 | Hall | G06F 3/03543 345/163 |
| 2012/0038496 | A1 | 2/2012 | Edwards | |
| 2013/0314338 | A1 | 11/2013 | Nam et al. | |
| 2014/0024110 | A1 * | 1/2014 | Knofe | G06F 3/0383 414/800 |
| 2014/0184505 | A1 | 7/2014 | Fullerton et al. | |
| 2014/0253445 | A1 * | 9/2014 | Petersen | G06F 3/0488 345/157 |
| 2014/0267150 | A1 | 9/2014 | Masashi | |
| 2015/0168123 | A1 | 6/2015 | Hautson | |
| 2015/0277598 | A1 | 10/2015 | Aurongzeb et al. | |
| 2016/0041678 | A1 | 2/2016 | Wu | |
| 2016/0077543 | A1 * | 3/2016 | Conro | G05G 9/047 74/471 XY |
| 2016/0195937 | A1 | 7/2016 | Tachiiri | |
| 2016/0299606 | A1 | 10/2016 | Go | |
| 2016/0313816 | A1 * | 10/2016 | Krishnakumar | G06F 3/0338 |
| 2016/0313819 | A1 | 10/2016 | Ancona et al. | |
| 2017/0277282 | A1 * | 9/2017 | Go | G06F 3/0354 |
| 2018/0154774 | A1 | 6/2018 | Park | |
| 2018/0299987 | A1 * | 10/2018 | Ballan | G06F 3/0442 |
| 2018/0314316 | A1 | 11/2018 | Xu et al. | |
| 2019/0041891 | A1 * | 2/2019 | Parazynski | G05G 1/06 |
| 2019/0041894 | A1 * | 2/2019 | Parazynski | G05G 1/04 |
| 2019/0113966 | A1 | 4/2019 | Connellan et al. | |
| 2019/0187856 | A1 | 6/2019 | Bruwer et al. | |
| 2019/0302904 | A1 | 10/2019 | Nieh | |
| 2019/0339776 | A1 | 11/2019 | Rosenberg et al. | |
| 2020/0004346 | A1 | 1/2020 | Vlasov et al. | |
| 2020/0371625 | A1 | 11/2020 | Katsurahira et al. | |
| 2020/0393865 | A1 * | 12/2020 | Parazynski | G05G 5/03 |
| 2022/0200337 | A1 | 6/2022 | Watanabe | |
| 2022/0342437 | A1 | 10/2022 | Xie | |
| 2022/0352635 | A1 | 11/2022 | Compton | |
| 2024/0382272 | A1 | 11/2024 | Sprenger | |

* cited by examiner

Magnet
230

Sensing
Element 202

Magnet
230

Sensing
Element 202

Human
Interface
Device 104

Body
220

Human
Interface
Device 104

Body
220

Top Portion 239

Bottom Portion 260

Body 220

Human Interface Device 104

Top Portion 239

Bottom Portion 260

Human Interface Device 104

Top Portion
239

MOBILE PASSIVE JOYSTICK WITH MAGNET SENSING

FIELD

Embodiments disclosed herein relate generally to user input in computing systems. More particularly, embodiments disclosed herein relate to systems and methods to obtain user input.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
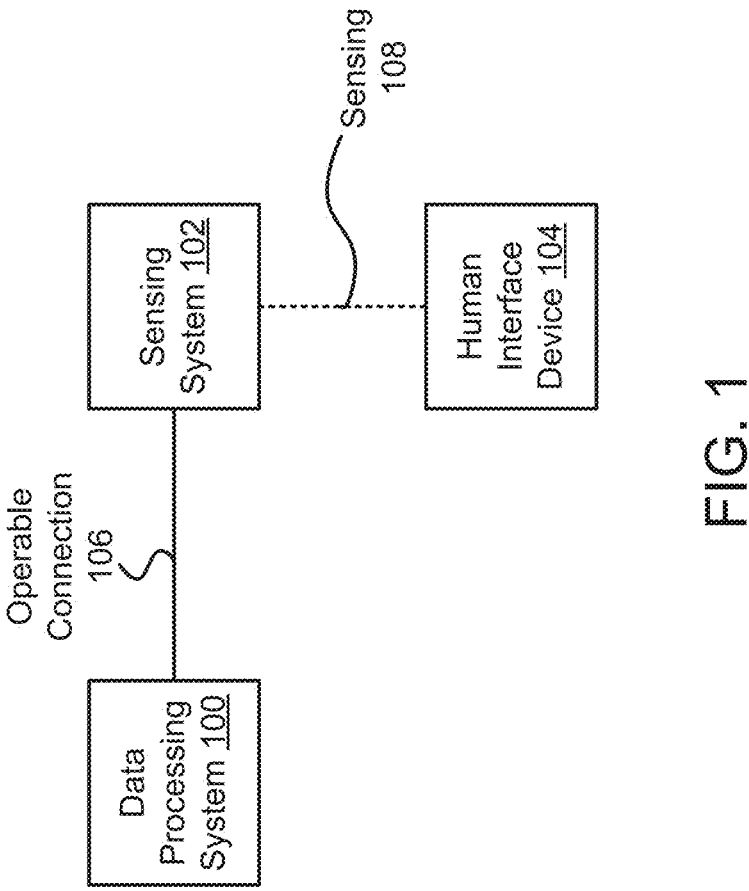
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained.

To obtain the user input, a human interface device may be used. The human interface device may be actuated by a user, and the actuations may be translated into magnetic field distributions detectable by a sensing system. The sensing system may sense the magnetic field distributions and obtain information reflecting changes in the position, orientation, and actuations of the human interface device. The magnetic field distribution may be generated using permanent magnets of the human interface device. Thus, information reflecting actuations of the human interface device by the user may be encoded in the magnetic field distributions and may be sensed.

By doing so, a system in accordance with embodiments disclosed herein may have improved portability and usability when compared to other types of devices used to obtain user input that may be powered. Thus, embodiment disclosed herein may address, among others, the technical challenge of loads placed on users during acquisition of user input and mechanical or electrical failure of devices tasked with obtaining the user input.

In an embodiment, a human interface device is provided. The human interface device may include a top portion comprising a permanent magnet that is adapted to generate a magnetic field distribution to encode user input received by the human interface device via forces applied by a user; and a bottom portion adapted to: reversibly secure the human interface device to a surface, reversibly secure the top portion to the bottom portion via a rotatable joint, and deform to enable the top portion to tilt with respect to a point on the surface to while the human interface device is secured to the surface and the top portion is secured to the bottom portion.

The top portion may also include a button that is mechanically coupled to the permanent magnet to translate the permanent magnet between two positions within the top portion.

The mechanical coupling may be adapted to return the permanent magnet to a first of the two positions while the user does not apply force to the button.

The top portion may also include a feedback element to provide haptic feedback while the button is actuated by the user.

The feedback element may be positioned below the permanent magnet, and the permanent magnet may be positioned below the button.

Rotation of the top portion with respect to the bottom portion may rotate the permanent magnet with respect to the bottom portion, and while the bottom portion is reversibly secured to the surface, the rotation of the permanent magnet may be in a first plane that is substantially parallel to a second plane in which the surface lies.

Poles of the permanent magnet may be aligned with a first plane, the rotatable joint may be a cylindrical joint having an axis, and the permanent magnet may be aligned with the axis so that the poles of the magnet rotate about the axis when the top portion is rotated with respect to the bottom portion.

The rotatable joint may be in a second plane that is substantially parallel to the first plane.

The human interface device may be a passive device.

The human interface device may not include semiconductor based devices.

In an aspect, a system is provided. The system may include a human interface device, comprising: a top portion comprising a permanent magnet that is adapted to generate a magnetic field distribution to encode user input received by the human interface device via forces applied by a user; and a bottom portion adapted to: reversibly secure the human interface device to a surface, reversibly secure the top portion to the bottom portion via a rotatable joint, and deform to enable the top portion to tilt with respect to a point on the surface to while the human interface device is secured to the surface and the top portion is secured to the bottom portion; and a sensing system adapted to sense the magnetic field distribution to provide user input from the user to a data processing system.

In an embodiment, a method of operating a data processing system is provided. The method may include obtaining user input using a human interface device and sensing system, as discussed above.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions may be sensed by various devices, and the sensing may be interpreted (e.g., translated) into the user input (e.g., data).

However, sensing physical actions by a user may involve use of sensors and/or devices that may consume power. The weight of the devices and forces applied by sources of the consumed power (e.g., batteries, cords to power supplies, etc.) may place a load (e.g., mechanical) on the user attempting to perform the physical actions. The mechanical load may fatigue the user, reduce the portability of the devices (e.g., mouses), and/or may be undesirable for other reasons.

In general, embodiments disclosed herein may provide methods, systems, and/or devices for obtaining user input and/or using the obtained user input to provide computer implemented services. To provide the computer implemented services, a system may include data processing system 100.

Data processing system 100 may include hardware components usable to provide the computer implemented services. For example, data processing system 100 may be implemented using a computing device such as a laptop computer, desktop computer, portable computer, and/or other types of computing devices.

Data processing system 100 may host software that may use user input to provide the computer implemented services. For example, the software may provide user input fields and/or other elements through which the user may provide information to manage and/or use the computer implemented services provided by data processing system 100.

To obtain the information from the user, data processing system 100 may obtain signals and/or data from sensing system 102 (e.g., via operable connection 106). Data processing system 100 may interpret (e.g., translate) the signals (e.g., may be analog, data processing system 100 may include an analog to digital converter) and/or data (e.g., digital data) to obtain the user input.

Sensing system 102 may track (e.g., by sensing 108) and/or provide information regarding tracking of human interface device 104, and provide the signals and/or data to data processing system 100. A user may physically interact with human interface device 104, thereby allowing the signals and/or data provided by sensing system 102 to include information regarding the physical actions of the user.

For example, if a user moves human interface device 104, sensing system 102 may track the change in position and/or motion of human interface device 104 (and/or portions thereof) and provide signals and/or data reflecting the changes in position and/or motion. Similarly, if a user actuates an actuatable portion (e.g., buttons) of human interface device, sensing system 102 may track the actuation of the actuatable portion and provide signals and/or data reflecting the actuation.

To track human interface device 104, sensing system 102 may include one or more sensors that sense a magnetic field distribution emanating from human interface device 104. The sensors may use the sensed magnetic field distribution to track a location (absolute or relative) and orientation (absolute or relative) of one or more magnets embedded in human interface device 104. The sensors may generate the signals and/or data provided by sensing system 102 to data processing system 100. The sensors may sense the magnitude and/or direction of the magnetic field distribution that passes proximate to each sensor (or a portion of). By knowing the relative placements of the sensors with respect to one another, the position and/or orientation of the one or more magnets may be known (e.g., the magnetic field distribution may be treated as emanating from the one or more magnets with known dimensions and/or field strength generation capabilities).

Sensing system 102 may also include, for example, analog to digital converters, digital signal processing devices or other signal processing devices, and/or other devices for generating the signals and/or data based on information obtained via the sensors.

Human interface device 104 may be implemented with a physical device that a user may actuate in one or more ways. For example, human interface device 104 may (i) be rotatable, (ii) tiltable, and (ii) may include one or more buttons. Actuating human interface device 104 may change the orientation and/or position of the one or more magnets with respect to the sensors of sensing system 102.

Figure 2A:
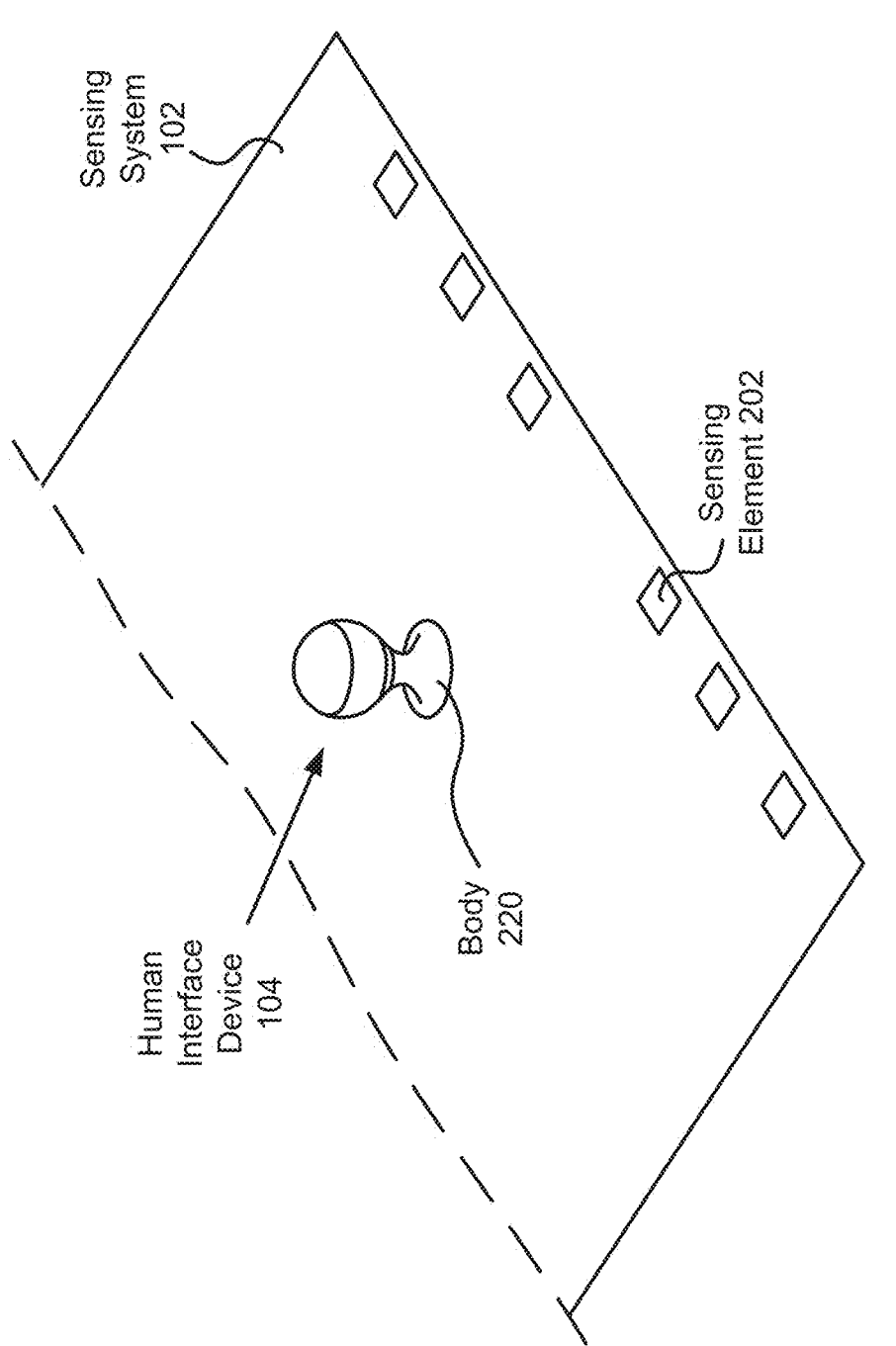
FIG. 2A shows a diagram illustrating a human interface device and a sensing system in accordance with an embodiment.
Figure 2B:
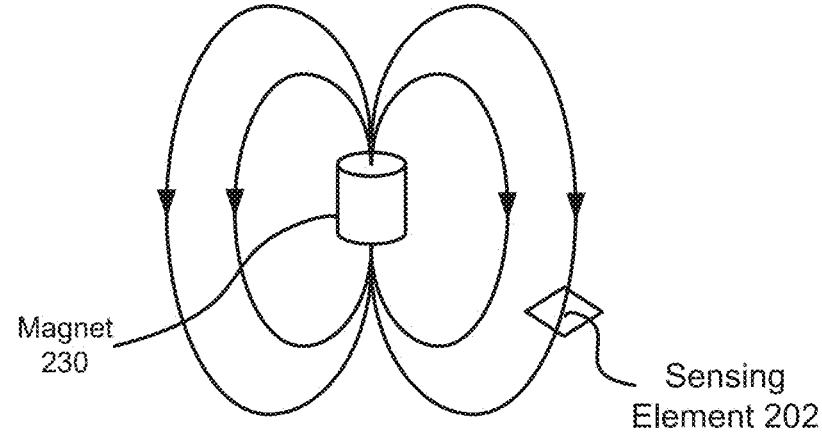
FIGS. 2B-2C show diagrams illustrating field sensing in accordance with an embodiment.
Figure 2C:
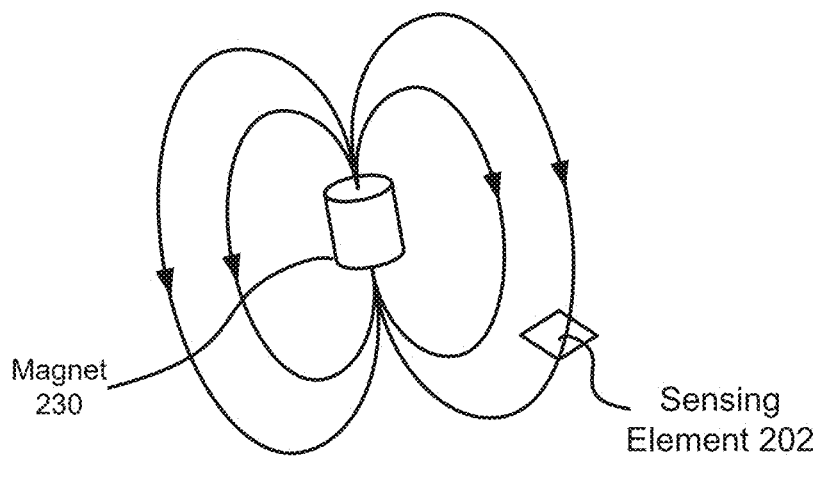

For example, when a portion of human interface device 104 is rotated with respect to sensing system 102, the strength and/or orientation of the magnetic field distribution emanating from the one or more magnets as sensed by sensors of sensing system 102 may change. Similarly, when buttons or other actuatable elements of human interface device 104 are actuated, the one or more magnets may be translated (e.g., in one or more planes) thereby changing the strength of the magnetic field distribution sensed by sensors of sensing system 102. Refer to FIGS. 2A-2C for additional details regarding sensing of human interface device 104.

Human interface device 104 may be a passive device. For example, human interface device 104 may not consume power, and may not include batteries, sensors, semiconductor based components/devices (e.g., chips), etc. Consequently, human interface device 104 may be of smaller size, lower weight, and/or may provide other advantages when compared to active devices such as a computer mouse. Refer to FIGS. 2D-2K for additional details regarding human interface device 104.

Data processing system 100 may perform a lookup or other type of operation to translate the signals and/or data from sensing system 102 into user input. Once obtained, the user input may be used to drive downstream processes (e.g., selections via a graphical user interface, indexing through data, etc.).

Figure 3:
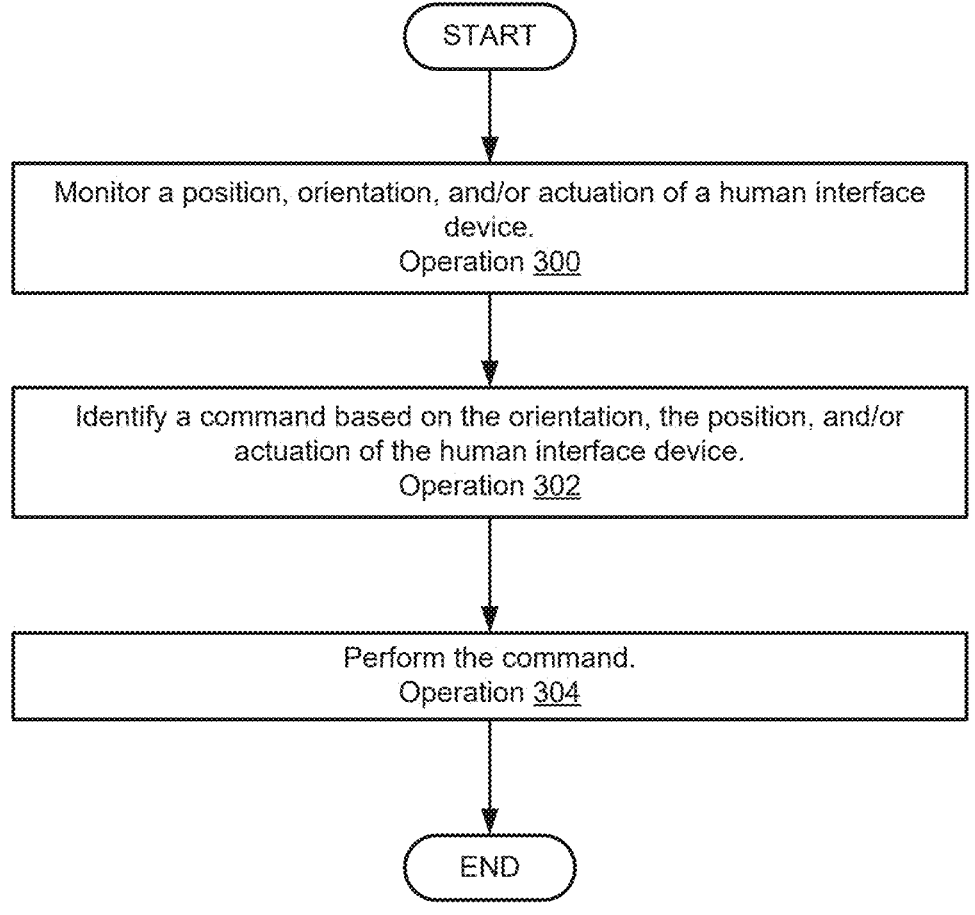
FIG. 3 shows a flow diagram illustrating a method of obtaining user input and providing computer implemented services in accordance with an embodiment.

When providing its functionality, data processing system 100 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection and/or via networks. However, in some embodiments, human interface device 104 may not be operably connected to other device (e.g., may be a passive device), but may be sensed by sensing system 102 via sensing 108. For example, during sensing 108, a static magnetic field distribution emanating from human interface device 104 and generated by at least one permanent magnet therein may be sensed by sensing system 102.

While illustrated in FIG. 1 as included a limited number of specific components, a system in accordance with an embodiment may include fewer, additional, and/or different components than those illustrated therein.

To further clarify embodiments disclosed herein, diagrams illustrating sensing of human interface device 104 in accordance with an embodiment are shown in FIGS. 2A-2C.

Turning to FIG. 2A, an isometric diagram of human interface device 104 and sensing system 102 in accordance with an embodiment is shown.

To obtain user input, human interface device 104 may include body 220 in which a permanent magnet is positioned. The magnet may be coupled to body 220 and to which a user may apply rotational, tilting, and/or translational force (e.g., may push down on body 220). For example, a user may grasp and press on surfaces of body 220 with fingers/thumb. The user may apply force to body 220 which may cause (i) a portion of body 220 to rotate, (ii) a portion of body 220 to tilt with respect to a surface on which body 220 is positioned, and/or (iii) a portion of body 220 move downward (e.g., button press).

To obtain user input, sensing system 102 may include any number of sensing elements (e.g., 202). The sensing elements may be sensors that monitor a magnitude and direction of a magnetic field distribution, and generate signals or data to reflect these quantities. While not shown, sensing system 102 may include a signal processing chain (e.g., any number of signal conditioning and processing devices) that may condition and process the signals generated by the sensing elements to obtain information regarding the location and/or orientation of any number of permanent magnets embedded in human interface device 104.

In FIG. 2A, sensing system 102 is illustrated in the form of a mat, a pad or other structure upon which human interface device 104 may be positioned (the dashed line to the top left of the drawing indicates that the structure may continue on beyond that which is explicitly illustrated). However, sensing system 102 may be implemented with other types of structures. For example, sensing system 102 may be integrated into a laptop, tablet, or other type of computing device case.

Additionally, while the sensing elements are illustrated with example positions, it will be appreciated that the sensing elements may be positioned differently without departing from embodiments disclosed herein.

Turning to FIGS. 2B-2C, diagrams illustrating a magnet and sensing element 202 in accordance with an embodiment are shown. As noted above, human interface device 104 may include a magnet (e.g., 230). The magnet may project a static magnetic field distribution, and may be a permanent magnet. In these figures, the magnetic field is illustrated using lines with arrows superimposed over the midpoints of the lines. The direction of the arrow indicates and orientation of the field.

As seen in FIG. 2B, when the magnet is proximate (e.g., within a predetermined distance range, which may vary depending on the strength of the magnet and a sensitivity level of sensing element 202) to sensing element 202, the magnetic field may be of sufficient strength to be measurable by sensing element 202. Sensing element 202 may utilize any sensing technology to measure the magnitude and/or the orientation of the magnetic field at its location. Due to the field distribution of the magnet, the magnitude and orientation of the magnetic field at the location of sensing element 202 may be usable to identify, in part, the location and orientation of magnets within a human interface device.

For example, when magnet 230 is rotated as shown in FIG. 2C from the orientation as shown in FIG. 2B, the direction and/or magnitude of the magnetic field at the location of sensing element 202 may change. By identifying the magnitude and orientation of the magnetic field at a number of locations (e.g., corresponding to different sensing elements), the position and orientation of magnet 230 may be identified. This may allow for rotation, tilting, and/or translation of the human interface device to be identified, and which may be caused by the user.

Although one individual magnet (e.g., magnet 230) is depicted in FIGS. 2B-2C, it is to be understood that multiple magnets may be included in a human interface device. For example, human interface device 104 may include multiple magnets that emanate a magnetic field distribution which may be sensed and used to identify the position/orientation of the magnets.

Turning to FIGS. 2D-2K, diagrams showing views of a human interface device in accordance with an embodiment are shown.

To provide user input, a user may apply various forces to human interface device 104. FIGS. 2D-2I show diagrams illustrating example applications of force and uses of human interface device 104 in accordance with an embodiment.

Figure 2D:
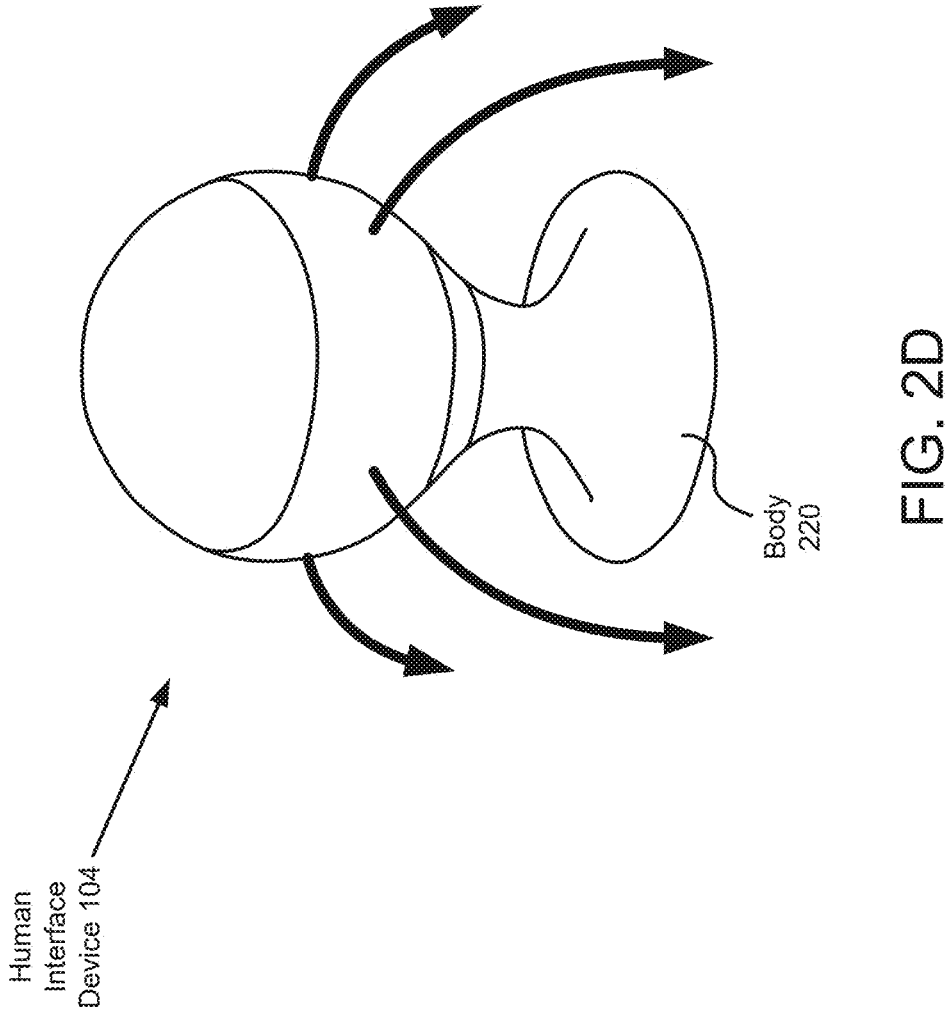
FIGS. 2D-2K show diagrams illustrating a human interface device in accordance with an embodiment.
Figure 2E:
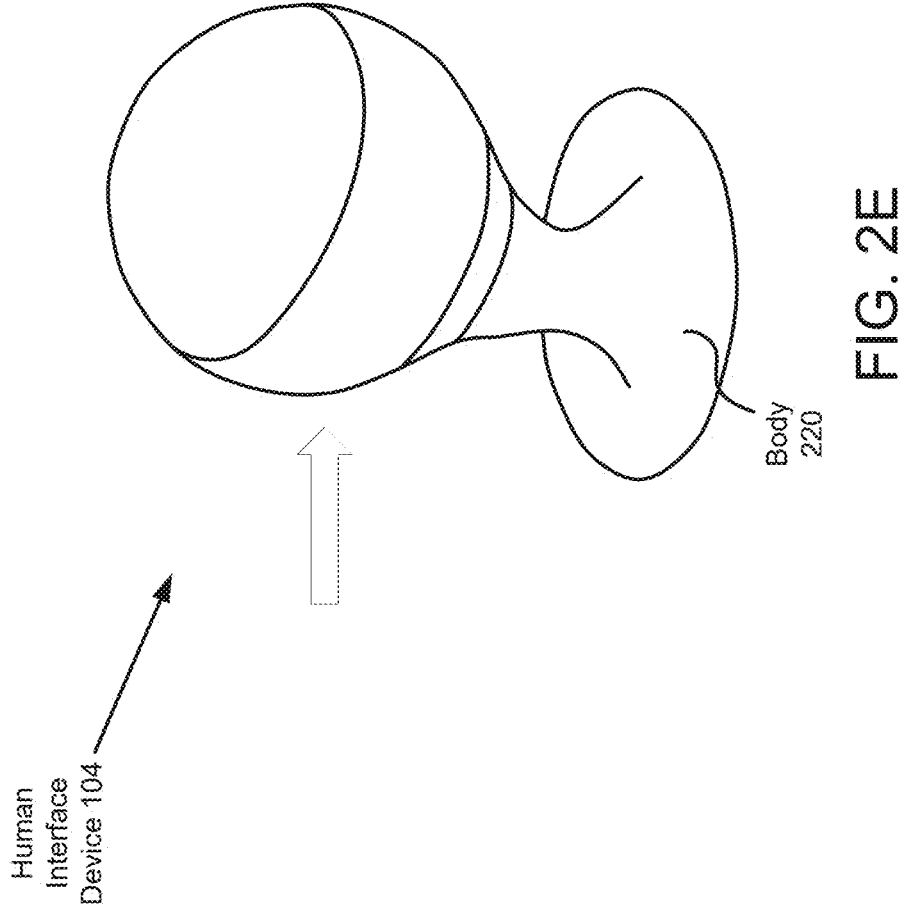

Turning to FIGS. 2D-2E, a first set of isometric diagram illustrating an example human interface device in accordance with an embodiment.

To provide user input, a user may apply translational force (e.g., force directed toward a side) to any of the side surfaces of body 220. When such force is applied, some of body 220 may tilt in response to the force. The oversized arrows in FIG. 2D indicate motions paths when such force is applied.

For example, in FIG. 2E, an oversized arrow with white infill is shown which may represent application of force by a user. As seen in FIG. 2E, the upper portion of human interface device 104 tilted to the right in response to the force. The change in tilt may change the magnetic field distribution emanating from human interface device. For example, the field distribution may generally rotate due to rotation of the permanent magnet positioned in human interface device 104.

Figure 2F:
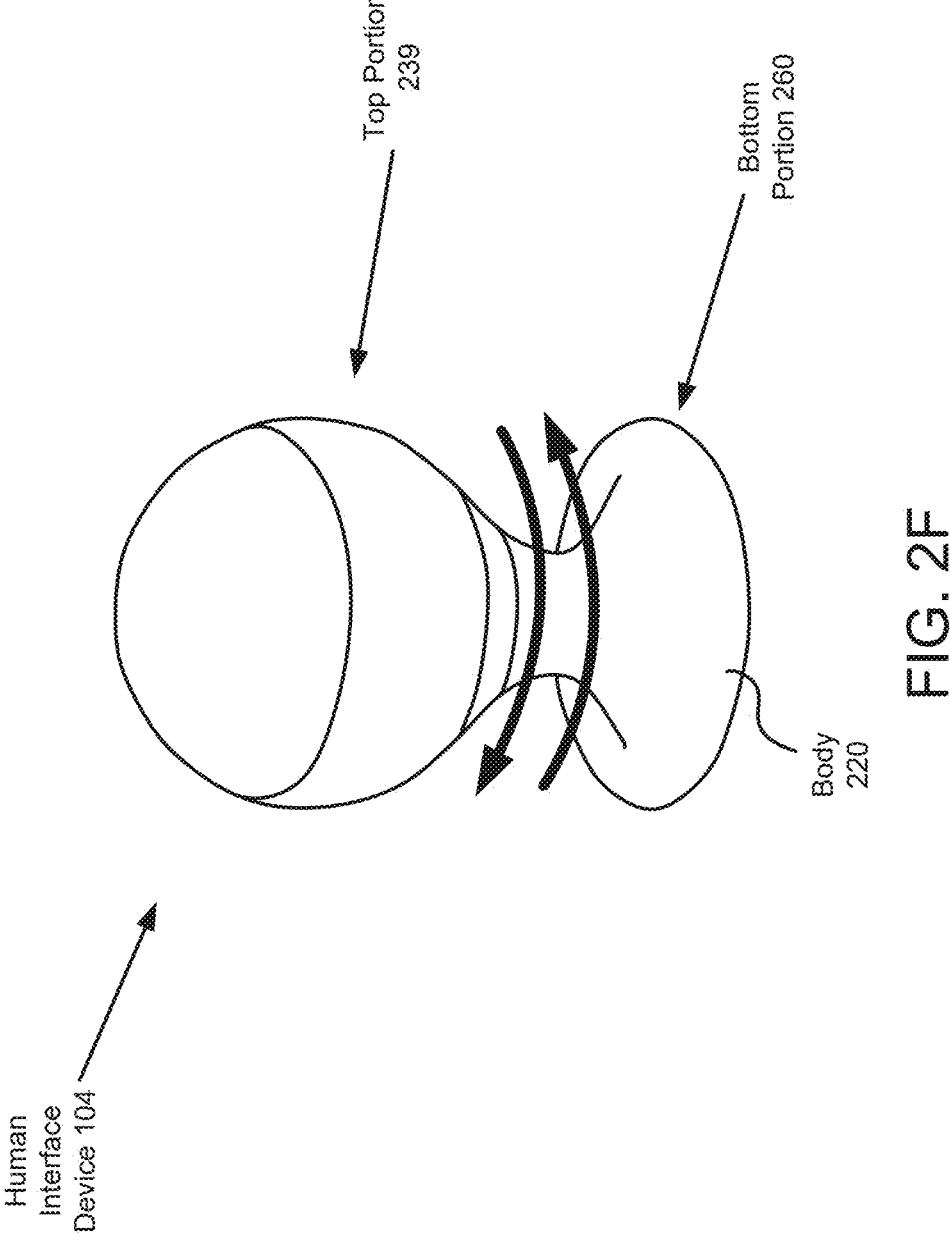

Turning to FIG. 2F, a second isometric diagram illustrating a second example human interface device in accordance with an embodiment.

In addition to tilting, a user may apply rotational force (e.g., force directed around the sides of human interface device) to body 220. When such force is applied, a top portion (e.g., 230) may rotate while a bottom portion (e.g., 260) may stay fixed in place if attached to a surface. The oversized arrows in FIG. 2F indicate motion paths when such force is applied to the top portion of human interface device 104.

The change in rotation may change the magnetic field distribution emanating from human interface device. For example, the field distribution may generally rotate due to rotation of the permanent magnet positioned in human interface device 104. The rotation due to tilting and the rotation due to rotation of the top portion may be in different planes. Consequently, the changes in magnetic field distribution may be different and may serve as signatures (when detected) in changes in forces applied to human interface device 104.

Figure 2G:
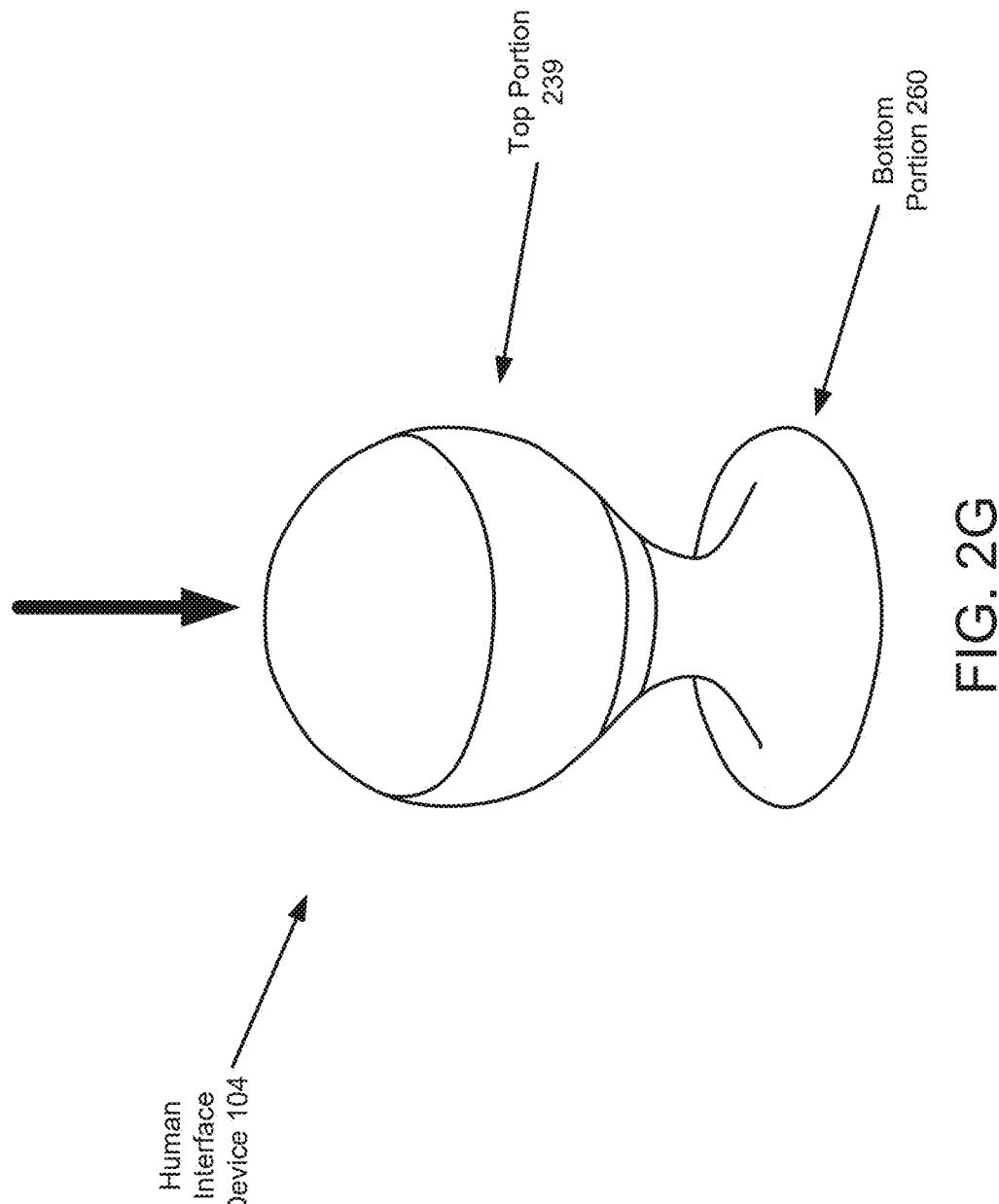

Turning to FIG. 2G, a third isometric diagram illustrating a third example human interface device in accordance with an embodiment.

In addition to tilting and rotating, a user may apply translational force to a top surface to body 220 (e.g., where a button may be positioned). When such force is applied, the top portion may compress and move downwards causing the magnet within human interface device 104 to also move downwards. The oversized arrows in FIG. 2G indicate motion paths when such force is applied to the top portion of human interface device 104.

The change in position may change the magnetic field distribution emanating from human interface device. For example, the field distribution may generally move downwards in space and then return when the force is removed, thereby acting as an additional signature distinct from the tilt and rotation signatures.

Thus, as illustrated in FIGS. 2D-2G, a user may apply forces to human interface device to provide a multitude of different user inputs (e.g., tilting, rotating, applying pressure to the top, etc.) using human interface device 104.

In addition to apply such force, a user may also remove top portion 239 from bottom portion 260 to provide further user input.

Figure 2H:
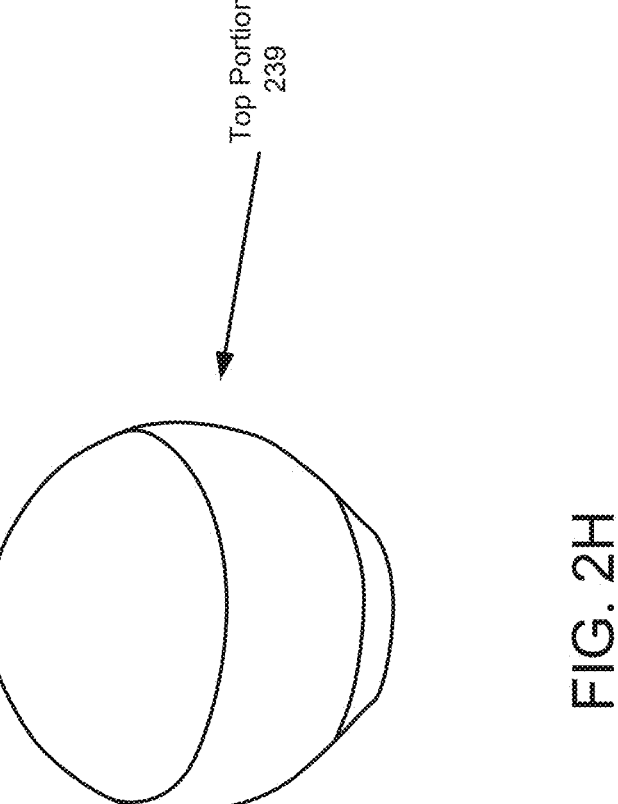

For example, turning to FIG. 2H, an isometric diagram illustrating an example separation of top portion 239 from human interface device 104 in accordance with an embodiment.

As seen in FIG. 2H, top portion 239 may be removed from bottom portion 260. When so removed, forces applied to top portion may cause top portion to translate and rotate. The resulting field distributions as sensed by various sensing elements may differ from the field distributions sensed by sensing elements while top portion 239 is attached to bottom portion 260 (e.g., while body 220 is positioned statically on a surface). Thus, when detected by sensing elements, the field distributions may be interpreted differently (e.g., may not assume that top portion 239 is generally attached to a surface.

Consequently, the spatial position and orientation of top portion 239 over time may be identified via the field sensing, and changes in the position and orientation may be interpreted as user input (e.g., whereas changes in tilt, rotation, and button depression may be treated as the user inputs while top portion 239 is attached to bottom portion 260).

Figure 2I:
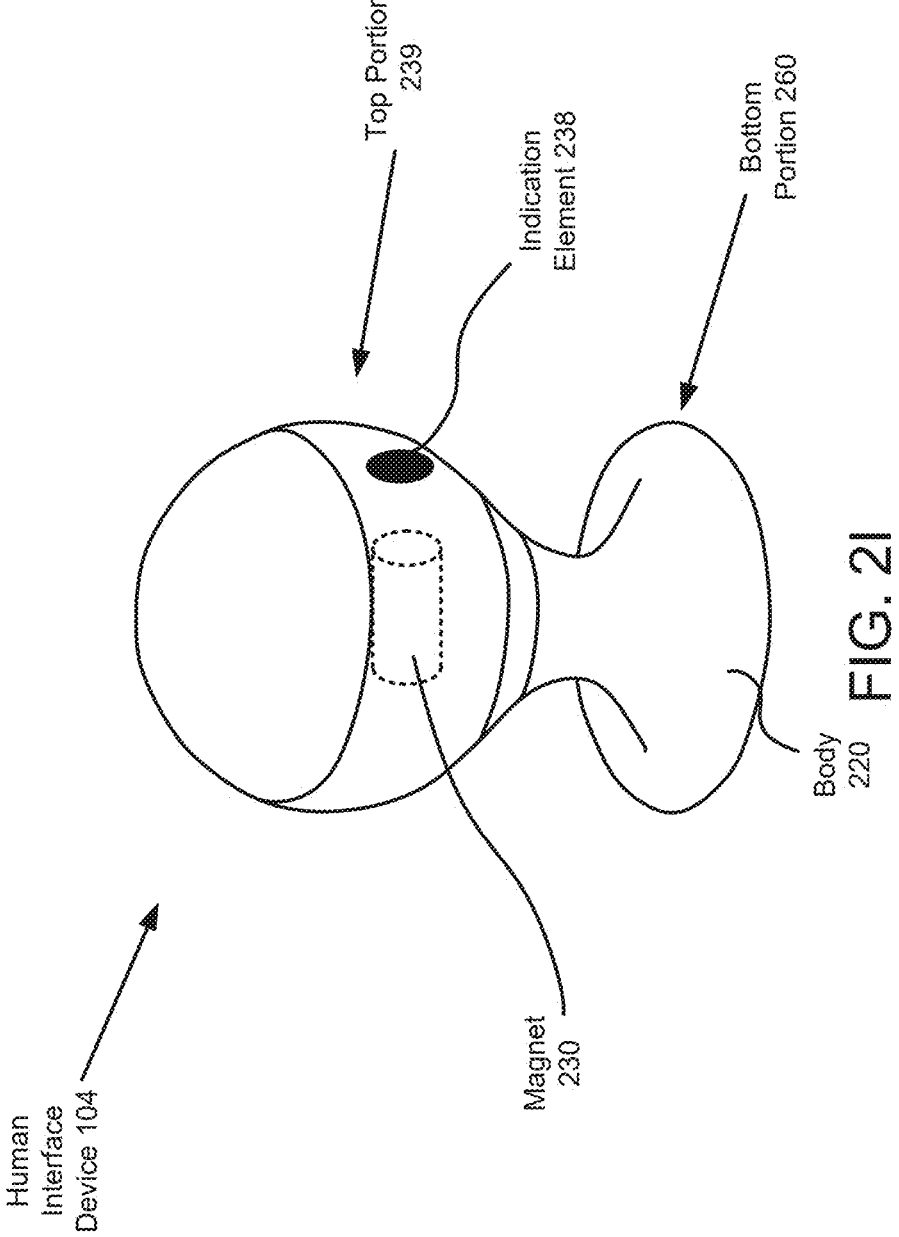

For example, turning to FIG. 2I, an example diagram similar to FIG. 2D in accordance with an embodiment is shown.

To generate the magnetic field distribution, magnet 230 may be positioned in top portion 239. Consequently, when top portion is tilted or rotated, the magnetic field distribution emanating from magnet 230 may change.

In an embodiment, the poles of magnet 230 aligned so that rotation of top portion 239 causes the poles to rotate (e.g., around an axis of rotation). In contrast, when top portion 239 is tilted, the poles may of magnet 230 may rotate in a plane that is perpendicular to a plane in which the poles of magnet 230 lie while no force is applied.

For example, if the width and depth of the page represent two axes, then poles of the magnet may fall on a plane aligned with the two axes. Rotational force may cause the poles of the magnet to rotate in the plane, while tilt force may cause the poles of the magnet to rotate out of the plane.

Top portion 239 may include an indication element (e.g., 238). The indication element may include, for example, raised or textured portions of the surface of top portion 239. The indication element may be aligned with a pole of magnet 230, and/or may be otherwise oriented with respect to magnet 230. Consequently, a user may utilize the alignment to identify how the magnet is positioned, and establish a front/back relationship with respect to different surfaces of top portion 239. As will be discussed below, this relationship may enable the user to orient and use top portion 239 to provide user feedback while top portion 239 is detached from bottom portion 260.

Figure 2J:
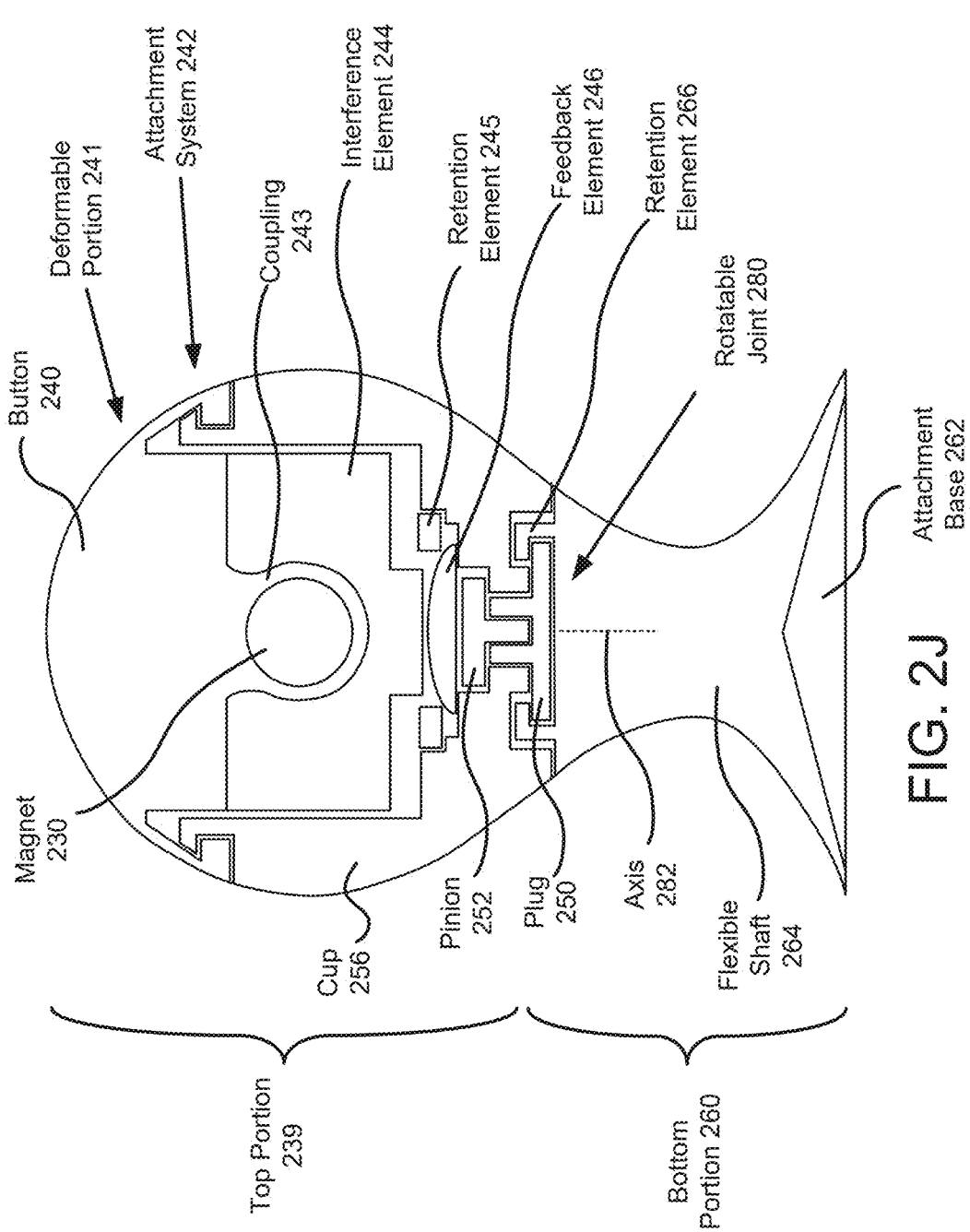
Figure 2K:
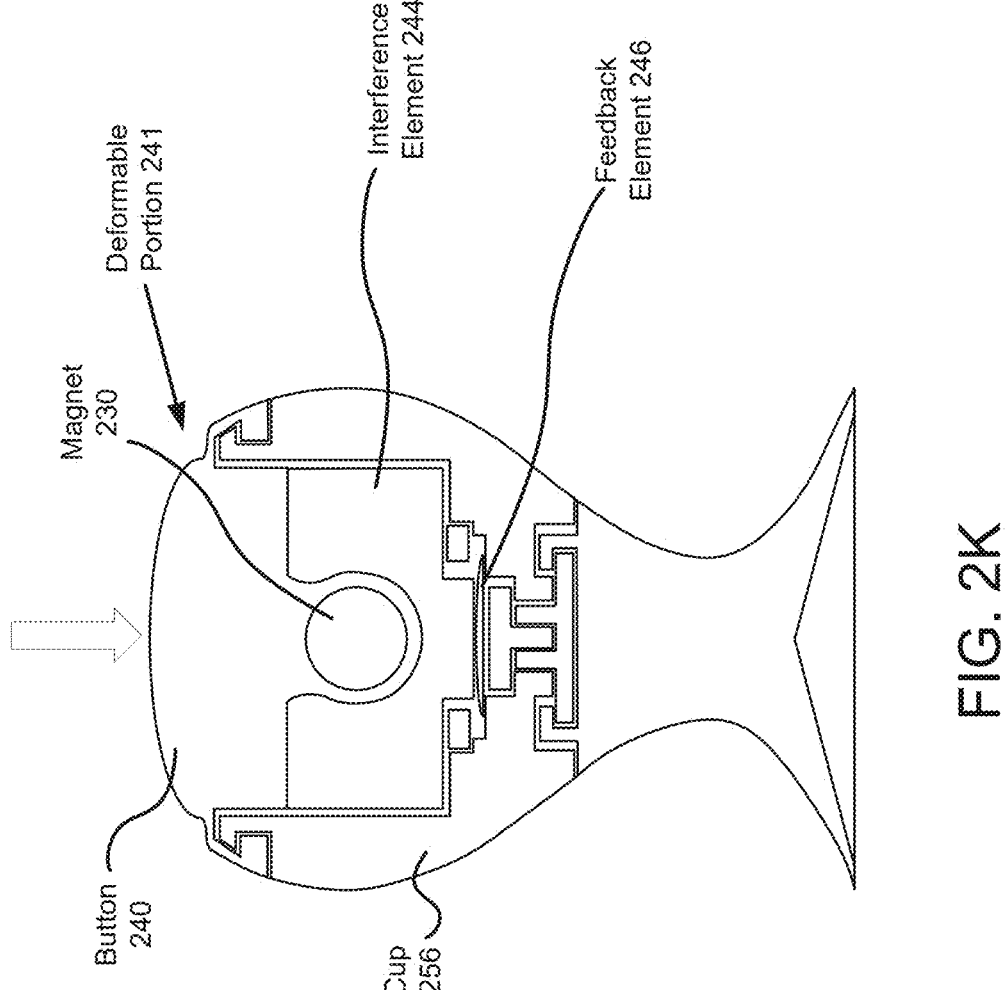

To provide the above noted functionality, a human interface device may include various components. FIGS. 2J-2K show cross section diagrams of human interface device 104 in accordance with an embodiment.

Turning to FIG. 2J, a first cross section diagram of human interface device 104 in accordance with an embodiment is shown. The cross section may down a center of human interface device 104. With respect to FIG. 2I, the cut plane may be aligned with the depth and height of the page, and may traverse through a center of body 220 (e.g., dividing magnet 230 in half).

As discussed above, human interface device 104 may include top portion 239 and bottom portion 260. Both may be structures and include various components.

To provide its functionality, top portion 239 may include button 240, coupling 243, magnet 230, interference element 244, retention element 245, feedback element 246, plug 250, and pinion 252. Each of these components is discussed below.

Button 240 may be a structure positioned at a top of the human interface device, and may be adapted to receive force from a user. Button 240 may be coupled to magnet 230 via coupling 243. For example, coupling 243 may include a recess in which magnet 230 may be inserted, and coupling 243 may be directly attached to the rest of button 240.

Button 240 may include a surface for receiving force from a user. When the force is received, deformable portions (e.g., 241) of button 240 may deform allowing magnet 230 and button 240 to move downward, into body 220. Refer to FIG. 2K for additional details regarding how application of force to button 240 impacts other components of human interface device 104.

Button 240 may be attached to other components of top portion 239 via one or more attachment systems (e.g., 242). For example, the attachment systems may include hooks and corresponding receptacles on button 240. When the hooks are pressed into the receptacles, button 240 may fixedly secure itself to other components of body 220.

Button 240 may also be attached to or in proximity to interference element 244. To provide a user with feedback regarding their application of force to button 240, feedback element 246 may be positioned in top portion 239 below magnet 230. When force is applied to button 240, interference element 244 may also move toward feedback element 246 and apply force to feedback element 246. When such force is applied, feedback element 246 may provide the user with auditory, haptic, tactile, and/or other types of sensory feedback.

For example, feedback element 246 may be implemented using a dome switch which may provide such feedback when sufficient force has been applied to feedback element 246.

To provide the force to feedback element, interference element 244 may be positioned with button 240 so that interference element 244 contacts and transmits force to feedback element 246 when force is applied to button 240.

When force is not applied to button 240, deformable portion 241 and/or feedback element 246 may apply force to return button 240 to an at rest position (e.g., the button may be in a second position when force is applied, such as an actuated position as shown in FIG. 2K).

To maintain positioning of button 240 and feedback element 246, top portion 239 may include cup 256. Cup 256 may be a structure to which other components of top portion 239 may be attached. Additionally, cup 256 may include side surfaces for receiving forces from a user (e.g., to tilt/rotate top portion 239).

Feedback element 246 may be retained with cup 256 using retention element 245. Retention element 245 may include, for example, washers, bolts, and/or other interference elements that retain feedback element 246 in position while allowing interference element 244 to contact feedback element 246.

Cup 256 may be coupled to bottom portion 260 via rotatable joint 280. Rotatable joint 280 may allow cup 256 and other portions of top portion 239 to rotate with respect to bottom portion 260 and about axis 282 (e.g., drawn with dashed line).

Rotatable joint may include plug 250 and pinion 252 of top portion 239, and retention elements (e.g., 266) of bottom portion 260. For example, plug 250 may include a disk that is retained in position with retention elements 266. Retention elements 266 may include a raised portion of bottom portion 260 that circumscribes the disk, and some cover elements that extend above the disk so that the disk cannot move away from bottom portion 260 but may rotate with respect to bottom portion 260.

The disk may include a raised section (e.g., a post receptacle) that enables pinion 252 to be attached to the disk (e.g., pinion may include a disk with a post extending from the disk that fixedly attached to the post receptacle). In turn, pinion 252 may establish an interference with cup 256 so that cup 256 may not move away from bottom portion without plug 250 being removed from the retention elements (e.g., may be deformable under pressure to facilitate click insertions and removals).

To provide its functionality, bottom portion 260 may include retention elements (e.g., 266), attachment base 262, and flexible shaft 264. Each of these components is discussed below.

Retention element 266 may, as discussed above, reversibly fixedly secure plug 250 with bottom portion 260.

Attachment base 262 may be a structure adapted for attachment to other structures such as sensing systems, or components with sensing systems integrated with them. Attachment base 262 may include, for example, a suction cup or other attachment element for reversible attachment to other structures.

Flexible shaft 264 may connect attachment base 262 to retention element 266. Flexible shaft 264 may have a length and may be made of a deformable material or may include deformation features such that the length may tilt with respect to attachment base 262. Consequently, when translational force is applied to side surfaces of cup 265, flexible shaft 264 may deform allowing top portion 239 to rotate away from the force and about attachment base 262.

Turning to FIG. 2K, a second cross section diagram of human interface device 104 in accordance with an embodiment is shown. The diagram may be similar to that shown in FIG. 2J. However, the diagram shown in FIG. 2K illustrates the changes to human interface device due to application of force (e.g., illustrated using the oversized arrow with white infill) to button 240.

As seen in FIG. 2K, when force is applied to button 240, deformable portion 241 may deform allowing magnet 230 and interference element 244 to move downward into cup 256 and make contact with feedback element 246. As seen in FIG. 2K, the contact may cause feedback element 246 to deform (e.g., dome switch being pressed). The deformation may cause feedback element 246 to provide the user with sensory feedback indicating that button 240 has been pressed sufficiently for user input to be registered.

Thus, the magnet may translate which may cause the signature of the magnetic field distribution from magnet 230 to change sufficiently for detection by sensing systems.

While FIGS. 2A-2K have been illustrated as including specific numbers and types of components, it will be appreciated that any of the devices depicted therein may fewer, additional, and/or different components without departing from embodiments disclosed herein.

As discussed above, the components of FIG. 1 may perform various methods to provide computer implemented services using user input. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of obtaining user input in accordance with an embodiment is shown. The method may be performed by data processing system 100, sensing system 102, human interface device 104, and/or other components of the system of FIG. 1.

At operation 300, an orientation and/or position of a human interface device, or portions thereof, as well as actuations thereof is monitored. The orientation, position, and/or actuations may be monitored by (i) confirming a type of human interface device, and, once confirmed: (ii) obtaining measurements of a magnetic field distribution emanating (e.g., outside of the human interface device) from at least one magnet positioned in the human interface device, and (iii) computing the orientation, position, and actuations based on the measurements.

To confirm the type of the human interface device (e.g., whether or not a joystick type of human interface device), the magnetic field distribution may be sampled using sensing elements. The sensing elements may then be used to compute a location of a magnet that generated the magnetic field distribution. If the location is a predetermined distance away from a sensing system (e.g., in a vertical direction away from a surface), and does not move in the other directions (e.g., along the surface), then it may be confirmed that the human interface device is a joystick type human interface device which may be similar to that shown in FIGS. 2A-2K.

If confirmed, then the measurement of the magnetic field distribution may be used to compute the location and orientation of the magnet over time. The location and orientation of the magnetic over time may be used to identify whether a user applied force to the human interface device to provide user input.

For example, if the magnet moves toward the sensing system a predetermined amount (and/or at specific levels of acceleration), then it may be concluded that a button on the human interface device has been pressed.

In another example, if the magnet rotates about an axis extending from the plane on which the human interface device is sitting, then it may be concluded that a user applied rotational force to a side surface of the top portion. The rate of rotation may be recorded and used as user input as well (e.g., both direction and rotation rate).

In a further example, if the magnet tilts with respect to the axes, then it may be concluded that a user applied tilt force to (e.g., normal to) a side surface of the top portion. Like the rotation rate, the degree of rotation may be recorded and used as user input as well (e.g., both tile direction and magnitude).

When the human interface device is tilted, the sensing elements may record the position of the center of the magnetic field P relative to O (e.g., center of the field). This data may be used to describe P expressed in spherical coordinates $(r, \theta, \varphi)$. $\theta$ may be the angle between the Y axis and a line segment from O to the observation point P projected on the XY plane. $\Phi$ may be the angle between the line segment and the Z axis.

With the human interface device is tilted, $\varphi$>zero, which may be used for speed in some applications. Likewise, $\theta$ may be used for the moving direction in some applications.

When the force is removed, the human interface device may return to an at rest position in which it is not tilted and the button is not depressed.

In a further example, if the magnet moves away from the sensing system a predetermined amount (and/or at specific levels of acceleration), then it may be concluded that the top portion has been removed and is being used in a different mode (e.g., pointing mode). The location, orientation, and position of the magnet may be recorded as user input along with information indicating that the top portion is being used in pointing mode rather than as a joystick.

At operation 302, a command is identified based on the orientation, actuation, and/or position of the human interface device. The command may be identified, for example, by (i) identifying the operating mode of the human interface device, and (ii) providing information regarding the operating mode and identified user input to an application.

For example, if in pointing mode, the location/orientation/actuation of the human interface device may be used to drive cursor movement and selection in an application.

In another example, if in joystick mode, the location/orientation/actuation of the human interface device may be used to drive character movement and action in an application.

It will be appreciated that the user input provided via the human interface device may be used to drive any number and types of functions of applications that consume the user input (e.g., with operating mode of the human interface device being used as context which may change how user input impacts operation of the applications).

At operation 304, the command is performed. The command may be performed, for example, by an operating system passing through or otherwise providing information regarding the command to an application or other consumer of the user input. The consumer of the command may then take action based on the command.

The method may end following operation 304.

Thus, using the method illustrated in FIG. 3, embodiments disclosed herein may facilitate obtaining user input and using the user input to provide computer implemented services. By obtaining the user input via a passive device (at least with respect to user input), a human interface device in accordance with embodiments disclosed herein may be of lower complexity thereby improving the likelihood of continued operation, may not be dependent on power sources, may not require as large of physical loads to be exerted by users, and may provide other benefits.

Figure 4:
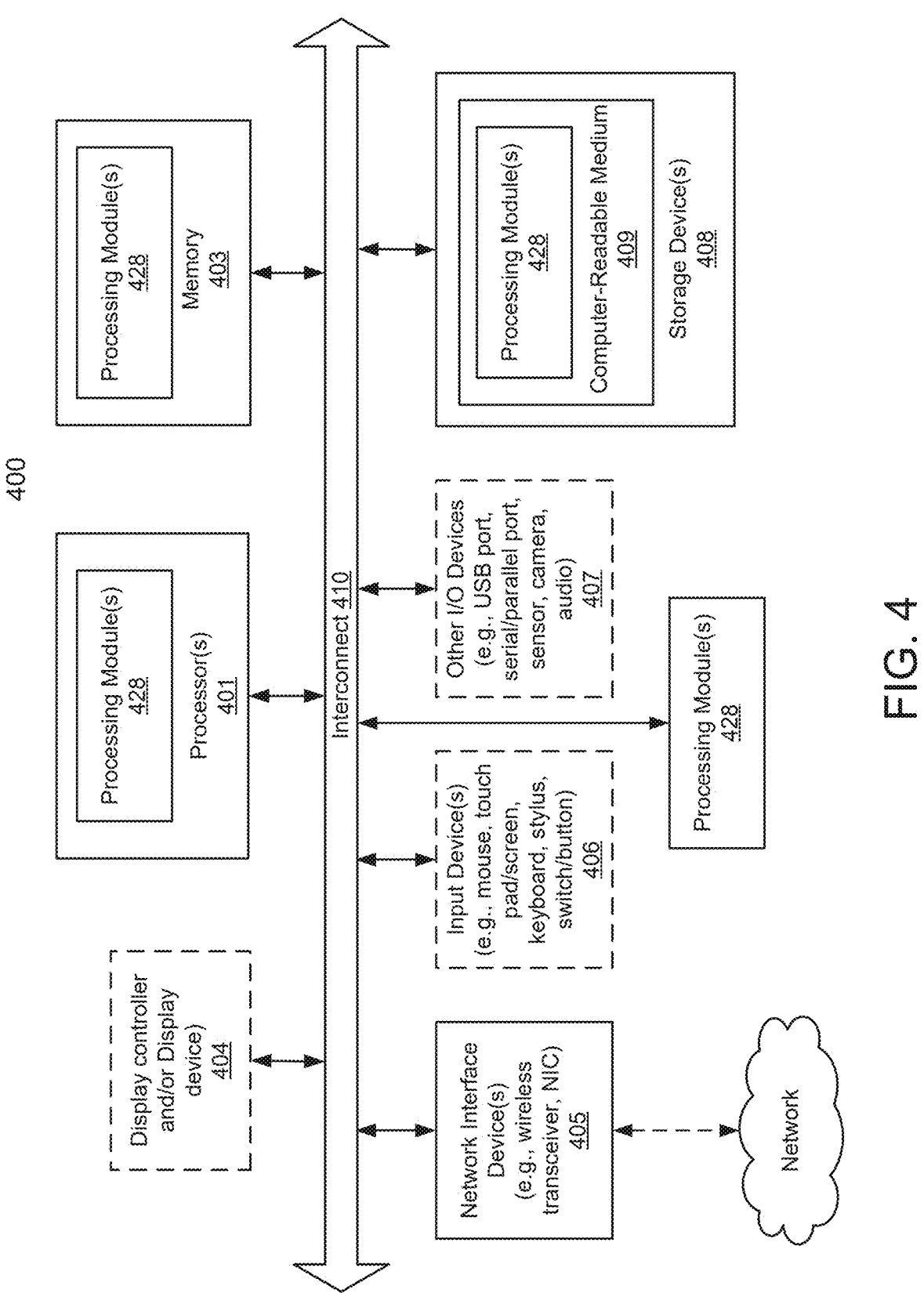
FIG. 4 shows a block diagram illustrating a data processing system in accordance with an embodiment.

Any of the components illustrated in FIGS. 1-2K may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of inter-connecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A human interface device, comprising:
a top portion comprising a permanent magnet that is adapted to generate a magnetic field distribution to encode user input received by the human interface device via forces applied by a user; and
a bottom portion adapted to:
reversibly secure the human interface device to a surface,
reversibly secure the top portion to the bottom portion via a rotatable joint, and
deform to enable the top portion to tilt with respect to a point on the surface to while the human interface device is secured to the surface and the top portion is secured to the bottom portion,
wherein the top portion further includes:
a cup, the permanent magnet being disposed within a first cavity of the top portion with a fixed orientation relative to the cup; and
a pinion with a post that projects through an opening in a bottom of the cup; and
a plug that reversibly couples to the pinion to from the rotatable joint, the plug being configured to be reversibly fixedly secured to the bottom portion,
wherein the bottom portion includes a flexible shaft with retention elements projecting from an upper end thereof, the retention element configured to reversibly fixedly secured the plug.

2. The human interface device of claim 1, wherein the top portion further comprises:
a button that is mechanically coupled to the permanent magnet, and
the button includes a deformable portion configured to accept a force applied by the user and to translate the permanent magnet between two positions within the cup based on the force.

3. The human interface device of claim 2, wherein the mechanical coupling is adapted to return the permanent magnet to a first of the two positions while the user does not apply the force to the button.

4. The human interface device of claim 2, wherein the top portion further comprises:
a feedback element to provide haptic feedback while the button is actuated by the user; and
an interference element that directly contacts the deformable portion and transmits force from the button to the feedback element.

5. The human interface device of claim 4, wherein the feedback element is positioned below the permanent magnet, and the permanent magnet is positioned below the button.

6. The human interface device of claim 1, wherein rotation of the top portion with respect to the bottom portion rotates the permanent magnet with respect to the bottom portion, and while the bottom portion is reversibly secured to the surface, the rotation of the permanent magnet is in a first plane that is substantially parallel to a second plane in which the surface lies.

7. The human interface device of claim 1, wherein poles of the permanent magnet are aligned with a first plane, the rotatable joint is a cylindrical joint having an axis, and the permanent magnet is aligned with the axis so that the poles of the magnet rotate about the axis when the top portion is rotated with respect to the bottom portion.

8. The human interface device of claim 7, wherein the rotatable joint is in a second plane that is substantially parallel to the first plane.

9. The human interface device of claim 1, wherein, when the top portion and the bottom portion are connected, the retention elements of the bottom portion project into and are accommodated by a second cavity of the top portion, the second cavity is connected to the first cavity by the opening at the bottom of the cup.

10. The human interface device of claim 4, wherein the pinion is retained at the bottom of the cup by the feedback element which is retained by a retaining element.

11. A system, comprising:
a human interface device, comprising:
a top portion comprising a permanent magnet that is adapted to generate a magnetic field distribution to encode user input received by the human interface device via forces applied by a user; and
a bottom portion adapted to:
reversibly secure the human interface device to a surface,
reversibly secure the top portion to the bottom portion via a rotatable joint, and
deform to enable the top portion to tilt with respect to a point on the surface to while the human interface device is secured to the surface and the top portion is secured to the bottom portion; and
a sensing system adapted to sense the magnetic field distribution to provide user input from the user to a data processing system,
wherein the top portion further includes:
a cup, the permanent magnet being disposed within a first cavity of the top portion with a fixed orientation relative to the cup; and
a pinion with a post that projects through an opening in a bottom of the cup; and
a plug that reversibly couples to the pinion to from the rotatable joint, the plug being configured to be reversibly fixedly secured to the bottom portion,
wherein the bottom portion includes a flexible shaft with retention elements projecting from an upper end thereof, the retention element configured to reversibly fixedly secured the plug.

12. The system of claim 11, wherein the top portion further comprises:
a button that is mechanically coupled to the permanent magnet, and
the button includes a deformable portion configured to accept a force applied by the user and to translate the permanent magnet between two positions within the cup based on the force.

13. The system of claim 12, wherein the mechanical coupling is adapted to return the permanent magnet to a first of the two positions while the user does not apply the force to the button.

14. The system of claim 12, wherein the top portion further comprises:
a feedback element to provide haptic feedback while the button is actuated by the user; and
an interference element that directly contacts the deformable portion and transmits force from the button to the feedback element.

15. The system of claim 14, wherein the feedback element is positioned below the permanent magnet, and the permanent magnet is positioned below the button.

16. The system of claim 11, wherein rotation of the top portion with respect to the bottom portion rotates the permanent magnet with respect to the bottom portion, and while the bottom portion is reversibly secured to the surface, the rotation of the permanent magnet is in a first plane that is substantially parallel to a second plane in which the surface lies.

17. The system of claim 11, wherein poles of the permanent magnet are aligned with a first plane, the rotatable joint is a cylindrical joint having an axis, and the permanent magnet is aligned with the axis so that the poles of the magnet rotate about the axis when the top portion is rotated with respect to the bottom portion.

18. The system of claim 17, wherein the rotatable joint is in a second plane that is substantially parallel to the first plane.

19. The human interface device of claim 10, wherein the interference element includes a projection configured to project through an opening of the retaining element to directly contact the feedback element when the force is applied to the button.

20. The human interface device of claim 10, wherein the feedback element is a dome switch configured to deform and provide haptic feedback when the force applied to the button translates the permanent magnet and the interference element toward the bottom of the cup such that the projection of the interference element directly contacts the dome switch with a sufficient force.

\* \* \* \* \*